Nov. 9, 1954

S. CERMINARA 2,694,156

TUNING OF VIBRATORY SYSTEMS

Filed Jan. 9, 1951

INVENTOR.
Sam Cerminara
BY
William D. Carothers
His Attorney.

Nov. 9, 1954  S. CERMINARA  2,694,156
TUNING OF VIBRATORY SYSTEMS
Filed Jan. 9, 1951  2 Sheets-Sheet 2
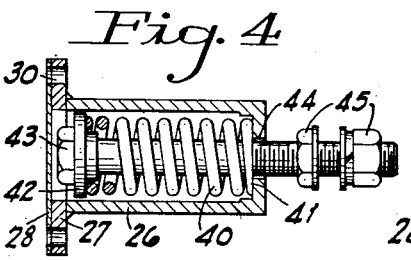
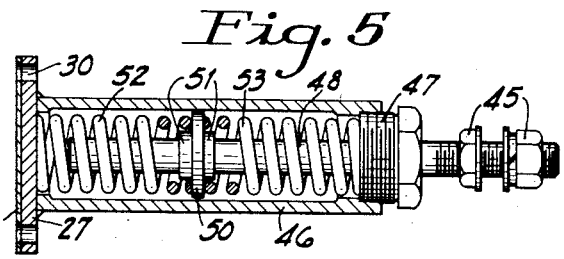
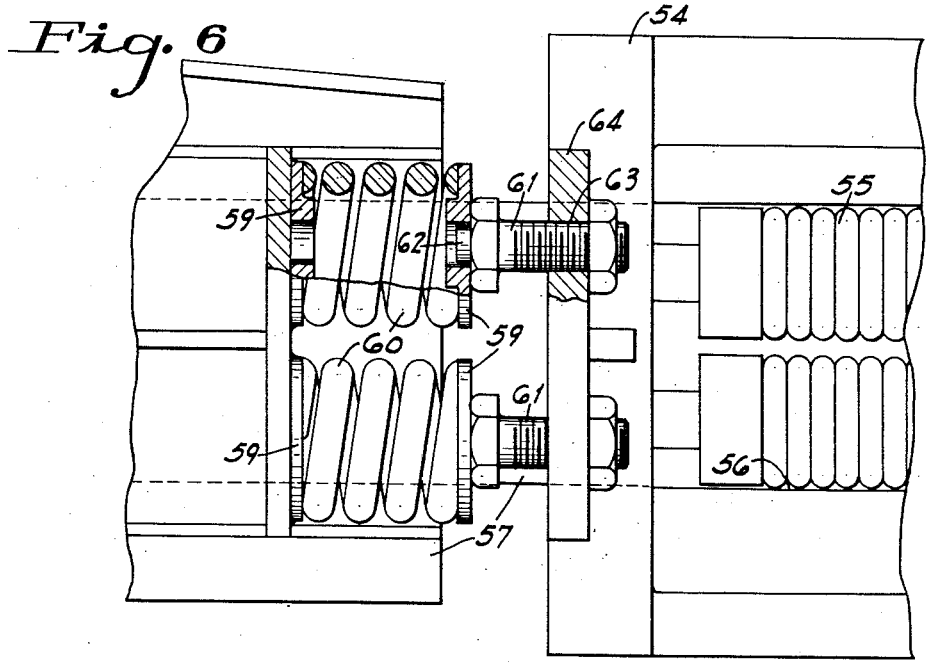
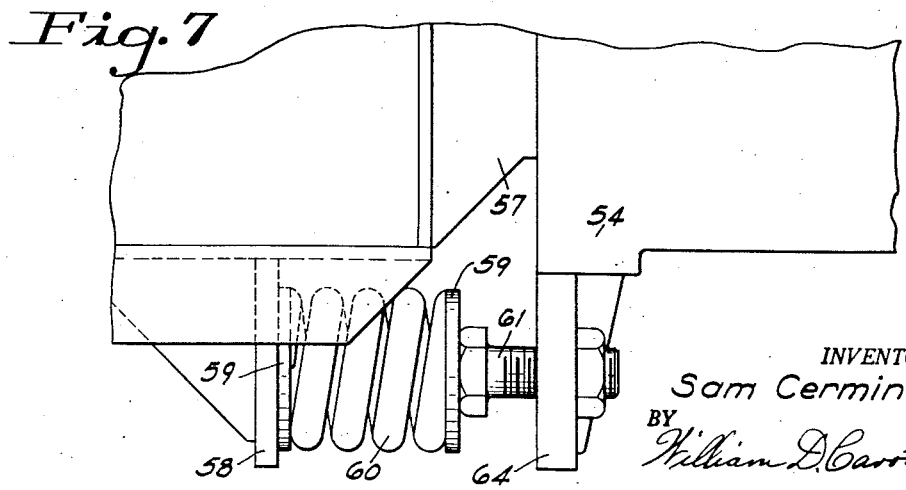
INVENTOR.
Sam Cerminara
BY
His Attorney.

United States Patent Office 2,694,156
Patented Nov. 9, 1954

2,694,156

TUNING OF VIBRATORY SYSTEMS

Sam Cerminara, Homer City, Pa., assignor to Syntron Company, Homer City, Pa., a corporation of Delaware Application January 9, 1951, Serial No. 205,140

6 Claims. (Cl. 310—19)

This invention relates generally to vibratory systems and more particularly to elastomer members for tuning spring-supported vibratory systems.

In the construction of spring-supported vibratory systems for vibrating, conveying or otherwise working materials, it is preferable that the natural period of vibration of the system is a few cycles off the frequency of the driving impulses so that the natural period of the system and the frequency of the driving impulses are not in synchronism or capable of developing a resonant condition.

In some spring-supported vibratory structures it is relatively easy to select the proper spring members that will properly tune the system and prevent resonance with the driving impulses. In other systems, such as with heavy feeders, it is sometimes difficult to properly tune them without increasing the number of springs or increasing the thickness of the springs. The changing of the number and size of springs by the cut and try method of tuning cannot accurately assure fine tuning but it is close. However, it takes a considerable amount of time to carry out the cut and try method and after the structure has been used for some time and the springs take a different set, it is difficult, if not impossible, to retune the system in the field since different size and number of springs are not available.

The principal object of this invention is the provision of a method and structure for finely and accurately tuning the vibrating system. This can be done by placing flexible members in multiple with the springs that form the vibratory system. These members may be elastomer members placed in shear or they may be preloaded coil springs placed in multiple with the leaf springs that support the system for vibration. The elastomer member may be a cylindrical rubber sleeve vulcanized to an inner and to an outer metallic sleeve. This elastomer member is applied by attaching one sleeve to the base and the other to the vibrating parts to place the elastomer in parallel with the leaf springs that support the system for vibration. The use of the elastomer members places an additional spring load on the leaf springs and, depending on the number used, permits tuning the natural period of vibrating system to a frequency that is a few cycles off the driving or energizing frequency. Further adjustment of the natural period can be accomplished by preloading the elastomer members. The rubber elastomer member also has the advantage of an internal dampening characteristic which absorbs energy, the amount absorbed increasing with an increase in the amplitude of vibration, thereby preventing the vibrating system from getting into resonance with the driving or energizing system. It is best that the natural period of vibration be a few cycles off the frequency of the driving force, so the vibratory system can follow the impulses of the driving force without matching the same which would create erratic operation of the vibratory system causing it to be ineffective for the purpose intended.

Another object is the provision of means for preloading the elastomer members to tune the mechanical vibratory system that they support.

Another object of this invention is the provision of preloading elastomer members mounted in multiple with leaf springs supporting a vibratory system to enable one to change the amplitude and retune the system by changing the preloading of the elastomer members. For example a series of leaf spring bars five-eighths inch thick may have a base amplitude of one-sixteenth of an inch movement. To increase this amplitude the bars may be changed to nine sixteenths and provide an amplitude of three thirty-seconds. However the preloaded elastomer members may be adjusted to properly tune this system at any amplitude within these limits to operate the mechanical vibratory system at a frequency a few cycles above or below the driving frequency. Erratic operation results when the mechanical vibratory system operates in the same period as that of the driving energy impulses.

Other objects and advantages appear hereinafter in the following description and claims.

The accompanying drawings show, for the purpose of exemplification without limiting the invention and claims thereto, certain practical embodiments of the invention wherein:

Fig. 4 is a sectional view of one of the tuning elastomer members constructed with a coil spring, which may be substituted for the elastomer members shown in Fig. 3.

Fig. 5 is a sectional view of one of the tuning elastomer members constructed with opposed coil springs, which may be substituted for the elastomer members shown in Fig. 3.

Fig. 6 is a side elevation partly in section of a helical spring tuning elastomer member applied to a conveyor.

Fig. 7 is a plan view of the structure shown in Fig. 6.

Figure 1:
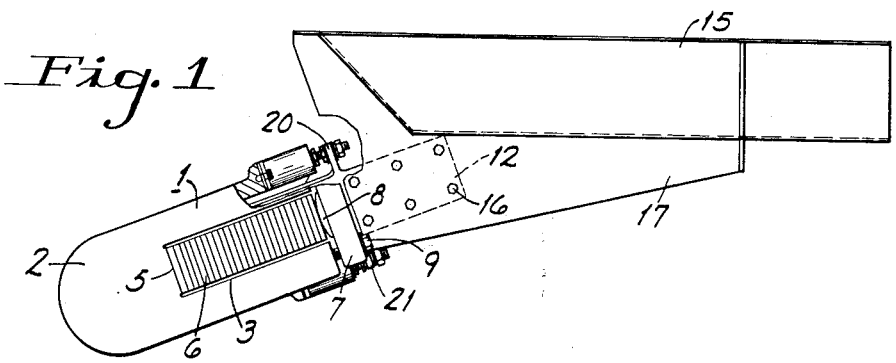
Fig. 1 is a view in side elevation with parts in section showing an electromagnetically operated vibratory conveyor with motor.
Figure 2:
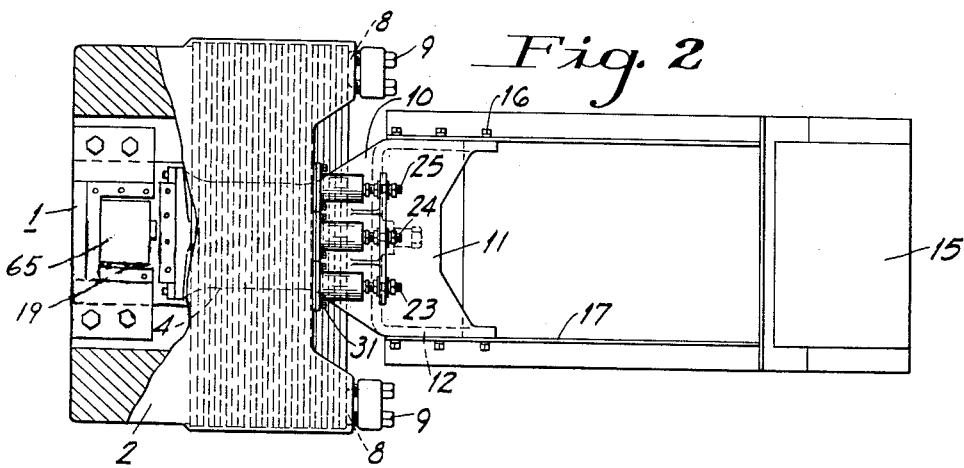
Fig. 2 is a bottom view partly in section of the motor structure and conveyor as shown in Fig. 1.

Referring to the drawing 1 indicates a vibratory motor which comprises the heavy base member 2 that is provided with a slot 3 and an armature space 4 giving the base member a U-shaped configuration. The slot 3 provides the casting with an opening that passes all the way through. The slot 3 on opposite sides of the base 2 is provided with the seats 5 for receiving the ends of the straight flat leaf springs 6 that extend from one end of the slot to the other. These flat springs are stacked one upon the other and are preferably spaced from the sides of the slot 3 as shown in Fig. 1. The number of springs and the size of the springs determine the natural frequency of the mechanical vibrating system supported by these springs. The springs are held in place by the cap members 7, each of which is provided with an arcuate pillow 8 that engages the springs adjacent their ends. The cap 7 is held to the base 2 by means of the four bolts 9 as indicated in Figs. 1 and 2. Thus by tightly clamping the ends of the relief springs 6 on the seats 5 in the base 2, the central portion of the springs are free to vibrate. The central intermediate portion of the springs are clamped to the armature member 10 and the fabricated frame which is made up of the flat plate 11 and the U-shaped yoke member 12. The armature member 10 and the frame are secured to the intermediate portions of the springs 6 so they may be free to vibrate. The electromagnetic field member 65 is made up of the coil and the core and is mounted to be effective for vibrating the armature 19 and the frame carrying the conveyor trough 15 which is bolted to the yoke 12 by means of the bolts 16 through the parallel members 17 that function as reinforcing ribs and are secured to the trough member 15.

This vibratory conveyor motor may be suspended by wires or it may be supported from the floor by some resilient means such as coil springs or rubber feet which prevent the transmission of vibrations.

The armature member 10 is provided with opposed flanges 20 and 21 which extend outwardly on opposite sides of the motor and have aligned openings for receiving the evenly spaced bolts 23, 24 and 25 for supporting the tuning elastomer members.

Figure 3:
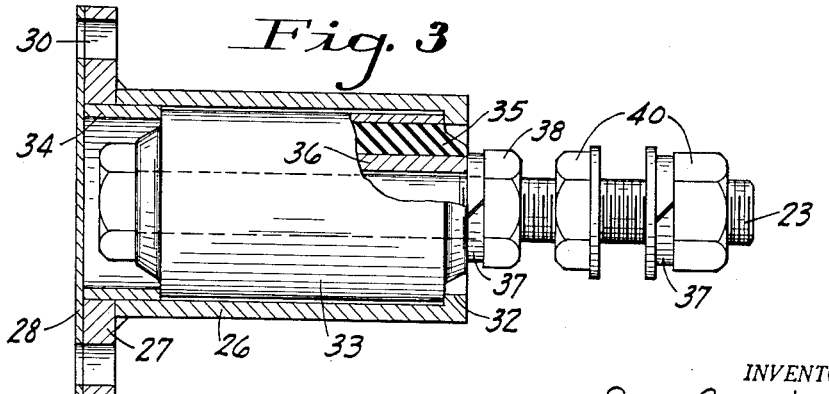
Fig. 3 is a sectional view of one of the tuning elasomer members as shown in Figs. 1 and 2.

As shown in Fig. 3 the elastomer members comprise the cylindrical casing 26 which is welded to the foot 27 and is closed at its bottom by the plate member 28. The plate 28 and the foot 27 are provided with the aligned openings 30 for receiving the mounting bolts 31 as shown in Fig. 2.

The casing 26 is provided with the inturned flange 32 which forms a shoulder against which the metallic sleeve 33 is seated. The opposite end of the sleeve is held by the ring member 34 which tightly clamps the metallic sleeve 33 between the plate 28 and the shoulder 32.

The sleeve 33 has vulcanized thereto an elastomer member 35 which is a sleeve made of plastic material, synthetic rubber or natural rubber and its bore has the inner metallic sleeve member 36 vulcanized thereto. The metallic sleeves 36 are arranged to receive the mounting bolts 23, 24 and 25, which bolts are provided with the lock washers 37 and the nuts 38. The bolts can be adjustably secured to the flanges 20 and 21 by means of the nuts 40. The nuts 40 are spaced from each other and their adjustment determines the amount of stress in shear placed on the sleeve 35 between the metallic sleeves 33 and 36. This stress also provides a preload between the base 2 and the armature 10, which preloading is in multiple or across the springs 6 and directly affect the tuning of the same. Thus by drawing up the bolts 23, 24 and 25 a shear load is placed on the elastomer member 35 with a tendency to flex the springs 6. This preload aids in tuning the mechanical vibrating system in such a way that it may be accurately tuned a few cycles more or less than the driving current impulses of the electromagnet 14. Thus standard springs may be stacked in the motor and their ends welded together without regard to tuning which is assumed by the elastomer members. When the latter take a set they may be taken up to return the system and when completely taken up they are readily replaced. A vibratory motor may be tuned periodically to insure proper operation which was not possible without this elastomer member.

In the structure of Fig. 4 the casing 26 has the spring 40 mounted therein. One end of the spring is seated in the socket 41 and the other end on the centering washer 42 on the bolt 43. The bolt passes through the opening 44 and is provided with the mounting nuts 45.

The structure of Fig. 5 is somewhat similar in that the casing 46 has the flange 27 and the closing plate 28 with the aligned bolt holes 30. The opposite end of the casing 46 is closed by the screw plug 47 having a clearance central opening for the bolt 48 with the mounting nuts 45 on the outer end. Intermediate the casing 46 the bolt 48 has the radial flange 50 with the guide shoulders 51 to center the springs 52 and 53 which are preloaded by the nut 47.

By attaching either of the elastomer members shown in Figs. 4 and 5 to the structure of Figs. 1 and 2 the vibratory system may be properly preloaded and tuned without selecting and replacing the flat leaf springs 6. The structures of Figs. 4 and 5 differ only in the character of resilient member from that shown in Fig. 3.

In Figs. 6 and 7 the conveyor base 54 has the ends of the leaf springs 55 clamped in the slots 56 and the intermediate part of the leaf springs are secured to the armature frame 57 which supports the armature in operative spaced relation to the core of the field member. The frame 57 is provided with outwardly projecting brackets 58 on which are mounted the centering seats 59 for supporting the helical springs 60. The seats 59 are welded in place as indicated. Another set of seats 59 is in engagement with the other ends of the springs 60 and is held in place by the bolt head 61 and the centering stub 62 that extends into the central opening of the spring seat 59. The bolts 61 engage the threaded holes 63 in the brackets 64 on the base member 54. The brackets 64 are coextensive of the brackets 58. The bolts 61 are adjusted in the threaded holes 63 to produce the proper compression on the springs 60 and determine any preloading of the vibrating system. It may be necessary to produce only enough pressure to hold the outer washers in place, that is no preloading pressure on the springs that would be effective as an initial pressure on the flat leaf springs, but would be effective when they vibrated the armature. Any initial compressive force on the springs 60 would tend to flex the intermediate portion of the leaf springs 55 outwardly and thus tend to increase the air gap between the armature and the field core.

With the elastomer members of Fig. 5 a load may be placed on the helical spring members without placing a load on the leaf springs. The elastomer structure of Fig. 4 having an initial compression on the springs would tend to flex the intermediate portion of the leaf springs 55 inwardly tending to reduce the air gap between the armature and the motor.

In each instance the preloading of the elastomer itself or the preloading of the vibratory system will have an effect on tuning the vibratory system when operated by current impulses. Thus in some instances it may be preferable to preload the vibratory supporting leaf springs in one direction or in the other or merely preload the elastomer members themselves and have no loading on the leaf spring of the vibratory system. It is sometimes difficult to determine which type of elastomer member to employ and the material handled as well as the type of equipment will affect the operation. This it is very advantageous to be able to assemble a motor, a certain number of leaf springs and the elastomer members which may be adjusted to properly tune the machine when installed. Otherwise it may take considerable time to change and select leaf springs in an attempt to properly tune the conveyor before it is installed. This at most would be a guess and the change of material may upset the whole of the tuning system. Thus time and materials are saved by providing these elastomer members and a more efficient operation can be obtained by retuning for each job and from time to time.

I claim:

1. A vibratory electromagnetic motor comprising a base, an electromagnetic field member mounted on the base, an armature member constructed to be attached to a member that is to be vibrated, a plurality of approximately tuned flat metallic springs attached to the armature member and to the base for supporting the member to be vibrated and the armature for vibration and in operative spaced relation to the field member to provide a vibrating system, an auxiliary vibratory element including an elastomer means comprising sets of opposed helical springs with their remote ends seated on one of said members and an extension means mounted on the other of said members and interposed between the adjacent ends of said springs, and means to change the relative positioning of the remote ends of each set of said springs to determine any relative initial load on said springs and to complete the tuning of the vibrating system.

2. A vibratory motor comprising a base, an element to be vibrated, a plurality of partially tuned springs connected between said base and the element to be vibrated to suspend the latter for reciprocation as a free body relative to said base, drive means to supply intermittent impulses to reciprocate said element on said spring suspension, an auxiliary vibratory structure connected between said base and said element to be vibrated and having an elastomer means which is prestressed to be effective in both directions to complete the tuning of said partially tuned spring suspension.

3. A vibratory motor comprising a base, an element to be vibrated, a plurality of partially tuned springs connected between said base and the element to be vibrated to suspend the latter for reciprocation as a free body relative to said base, drive means to supply intermittent impulses to reciprocate said element on said spring suspension, an auxiliary vibratory structure connected between said base and said element to be vibrated and having helical spring means which are prestressed to be effective in both directions to complete the tuning of said partially tuned spring suspension.

4. A vibratory motor comprising a base, an element to be vibrated, a plurality of partially tuned springs connected between said base and the element to be vibrated to suspend the latter for reciprocation as a free body relative to said base, drive means to supply intermittent impulses to reciprocate said element on said spring suspension, an auxiliary vibratory structure connected between said base and said element to be vibrated and having an elastomer member with its opposed surfaces secured relative to the base and said element to be vibrated and being prestressed to be effective in both directions to complete the tuning of the partially tuned spring suspension.

5. A vibratory motor comprising a base, an element to be vibrated, a plurality of partially tuned springs connected between said base and the element to be vibrated to suspend the latter for reciprocation as a free body relative to said base, drive means to supply intermittent impulses to reciprocate said element on said spring suspension, an auxiliary vibratory structure having coaxially concentric members, an elastomer sleeve secured to both coaxially concentric members, attaching means to secure one member to said base, attaching means to secure the other member to said element to be vibrated, and adjusting means associated with one of said attaching means to prestress the elastomer sleeve in sheer in either direction to complete the tuning of said partially tuned spring suspension.

6. A vibratory motor comprising a base, an element to be vibrated, a plurality of partially tuned flat metallic springs having their ends attached to said base and their intermediate portion attached to said element to be vibrated to support the latter for reciprocation as a free body relative to said base, drive means to supply intermittent impulses to reciprocate said element on said spring suspension, an auxiliary vibratory structure connected between said base and said element to be vibrated and having elastomer means which is prestressed to be effective in completing the tuning of the partially tuned flat spring suspension.

References Cited in the file of this patent

UNITED STATES PATENTS

| Number | Name | Date |
|---|---|---|
| 985,547 | Pryce | Feb. 28, 1911 |
| 1,479,843 | Reynolds | Jan. 8, 1924 |
| 2,310,185 | Weyandt | Feb. 2, 1943 |
| 2,539,391 | Alvord | Jan. 30, 1951 |